June 13, 1967     K. SCHROTER     3,324,683

UNIVERSAL JOINT

Filed Oct. 23, 1965

INVENTOR
KURT SCHROTER

BY Edmund M. Jaskiewicz

ATTORNEY

United States Patent Office 3,324,683
Patented June 13, 1967

3,324,683
UNIVERSAL JOINT
Kurt Schroter, Lohmar, near Siegburg, Germany, assignor to Firma Jean Walterscheid KG., Siegburg-Lohmar, Germany, a corporation of Germany
Filed Oct. 23, 1965, Ser. No. 502,885
Claims priority, application Germany, Oct. 28, 1964, W 37,860
5 Claims. (Cl. 64—21)

The present invention relates to a homokinetic universal joint, more particularly to a wide angle non-sliding homokinetic universal joint wherein the two members are drivingly connected by a plurality of axially movable balls retained in a spherical cage.

Various forms of homokinetic universal joints have been devised wherein the torque is transmitted by balls housed in a cage or retainer ring positioned between the spherical internal and the cylindrical external body. The internal body and the external body each have corresponding longitudinal grooves in which the balls are guided and these bodies pivot around the center of the joint. In such joints structure has been provided to limit the longitudinal movement of the balls. In some of these universal joints structure has also been provided to maintain the torque-transmitting balls in a plane which bisects the angle between the pivoting internal and external bodies. This relationship provides a uniformity in the transmissions of the torque.

In many such universal joints the ball retainer rings or cages have a spherical shape and are hollow with tangential slots for the balls. These cages are located between the internal and external bodies and retain the ball in one plane. However, such universal joints with parallel axial grooves for the balls and a ball cage can function effectively only if the angle between the axes of the internal and external bodies is always wider than the friction angle between surfaces of the contacting elements. As a practical matter, such universal joints can not be used if the angle between the internal and external bodies during operation is less than 14°.

In an attempt to remedy this disadvantage, such universal joints have been provided with various forms of control structures for either the retainer ring or the balls to maintain the proper alignment of the balls during both straight or slightly angular positions of the universal joint. However, such special structures have not been suitable for those universal joints having pivoting angles greater than 45°. The space occupied by such structures in those universal joints limits the pivoting angle to a maximum of about 35°.

It is therefore the principal object of the present invention to provide a novel and improved homokinetic universal joint.

It is another object of the present invention to provide a non-sliding homokinetic universal joint having linear grooves for the torque transmitting balls and which can be used for wide angles up to 50°, but which is simple in construction.

The present invention essentially comprises a homokinetic universal joint wherein to the end of one shaft entering the joint there is provided a face gear having circular gear teeth. A second face gear is in mesh with the first face gear and is provided on its other end with a ball which is received in a socket in the end of the second shaft entering the joint. The center of the ball and socket connection coincides with the center of the pitch circle of the second face gear.

The second face gear is formed on the enlarged end of a mushroom shaped supporting element. This enlarged end has a partial spherical shape on its periphery. The ball retainer ring, positioned between the external and internal bodies is provided with a cylindrical extension which rests on the spherical portion of the supporting element.

The second shaft may be provided with a longitudinal center bore having an enlarged diameter portion at its universal joint end. In this enlarged portion there is an insert which has the socket. An adjusting screw can be threaded in the bore to engage the insert and thereby to adjust its axial position.

The universal joint disclosed in this invention has the advantage that it can be used in wide angle operation up to about 50° and also at small angles. Even when the joint is axially aligned, i.e., straight transmission, the balls are accurately and steadily guided to provide for uniform transmission of torque. The face gears are particularly suited for absorbing axial forces, especially when the circularly shaped gear teeth have an involute cross section with an enlarged gear angle. The adjustment of the axial play reduces the precision to which the components of the universal joint must be manufactured, simplifies the assembly operations of the joint, and enables the shaft elements to be balanced after uneven wear resulting from long usage. Further, all of the joint components can be readily fabricated with simple and standard machine tool operations.

Other objects and advantages of the present invention are readily apparent when taken in conjunction with the following drawings wherein.

Returning now to the drawings wherein like reference symbols indicate the same parts throughout the various views, a specific embodiment of this invention will next be described in detail.

Figure 1:
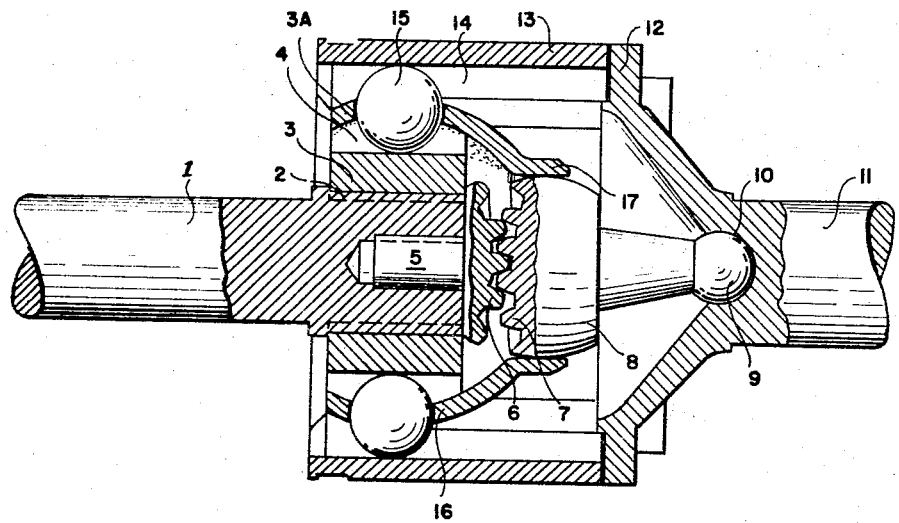
FIGURE 1 is a longitudinal sectional view of the universal joint of the present invention in straight line transmission position.

As seen in FIGURE 1, there is a drive shaft 1 having splines 2 on its end entering the universal joint. An internal body 3 is mounted on the splines 2 and has a partial spherical outer surface indicated at 3A. This outer surface 3A is provided with six linear grooves 4 having semicircular cross sections. A fastening screw 5 is threaded into the end of the drive shaft 1 and has an enlarged head upon which is a face gear 6 having a plurality of circularly arranged gear teeth. The gear teeth have involute cross sections.

Meshing with the face gear 6 is a second face gear 7 mounted on the enlarged end of a mushroom-shaped support element 8. The other end of the support element is a sphere 9 received within a socket 10 formed in the end of the drive or output shaft 11.

The output shaft is provided with flange 12 to which is connected a cylindrical shaped external body 13 of the universal joint. The inner face of the external body 13 is similarly formed with six linear ball grooves 14 of semicircular cross section which correspond to the grooves 4 of the internal body 3. Six balls 15 are positioned in the axial grooves and are maintained therein by a ball retainer ring 16. The ring 6 has a cylindrical extension 17 which rests on the partial spherically shaped end of the support element 8.

Figure 2:
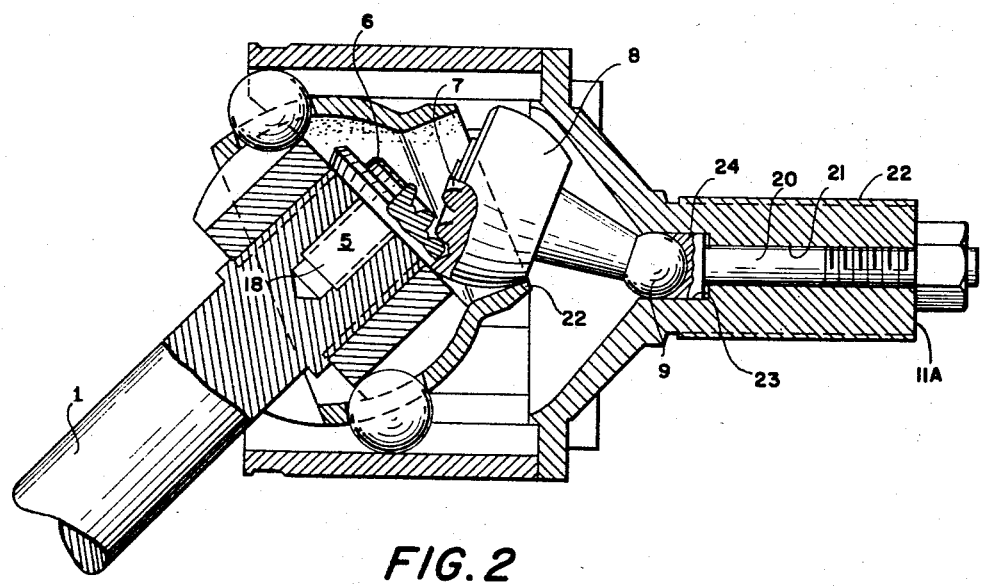
FIGURE 2 is a similar section view but showing the universal joint in angular transmission position and provided with a structure for adjusting the axial play.

As can be seen in FIGURE 2 the disclosed structure of the ball retainer ring 16 enables this universal joint to be used for wide operating angles up to about 50°. The pivot center 18 of the internal body and the pivot center 19 coincide with the centers of the pitch circles of their respective face gears 6 and 7.

FIGURE 2 also illustrates that when the support element 8 pivots out of the cylindrical extension 17 of the retainer ring 16, the only contact between the support element 8 and the ring 16 is at the point 22. However, the guiding action at the point 22 is sufficient to maintain the retainer ring 16 in correct position even at a wide angle.

In FIGURE 2 there is also shown a structure for adjusting the axial setting of the joint components. This comprises a screw 20 which is threaded in a longitudinal bore 21 of the drive shaft 11A. The shaft 11A here is only partial and is provided with splines 22 for the connection thereto of a longer output shaft. The bore 21 is provided with an enlarged diameter portion 23 in which is positioned an insert 24. The socket 10 is formed within the insert 24 to receive the ball 9 as described above.

Thus by adjusting the screw 20 the axial setting of the support element 8 can be readily changed to compensate for uneven wear of the joint components as a result it is not necessary to manufacture the joint components to such high standards of precision.

Thus it can be seen that the present invention provides a simple yet effective wide angle homokinetic universal joint.

The invention has been described with reference to a preferred embodiment thereof, but it will be understood that variations and modifications can be effected within the spirit and scope of the invention as described hereinabove and as defined in the appended claims.

What is claimed is:

1. A homokinetic universal joint comprising a spherical shaped internal member on one end of a first shaft, there being longitudinally extending grooves on said internal member, a cylindrical external member on one end of a second shaft and surrounding said internal member, there being longitudinally grooves in the inner surface of said external member corresponding with said internal member grooves, a plurality of balls within said corresponding internal and external member grooves to operatively connect the same, a cage member between said external and internal members and retaining said balls, a first face gear having circularly arranged gear teeth on the said end of said first shaft, and a pivot support member having a second face gear on one end thereof meshing with said first face gear and a ball on the other end thereof, there being a socket in said end of said second shaft receiving said ball whereby said support member is pivotally mounted, the center of said ball and socket coinciding with the center of the pitch circle of said second face gear.

2. A homokinetic universal joint as claimed in claim 1 wherein said cage has a cylindrical extension over the face gear end of said support member, the peripheral edge of said face gear end being spherical and pivotable within said cage cylindrical extension so that said extension is supported by said support member.

3. A homokinetic universal joint as claimed in claim 1 with said one end of said first shaft having a threaded bore therein, said first face gear having a threaded stem received within said threaded bore.

4. A homokinetic universal joint as claimed in claim 1 with there being a longitudinal bore with threads therein through said second shaft with an enlarged diameter portion at said one end, and insert in said enlarged diameter portion with said socket being in said insert, and a bolt threadedly received within said bore threads with the inner end of said bolt engaging said insert whereby said insert can be adjustably positioned by said bolt.

5. A homokinetic universal joint as claimed in claim 1 wherein the distance between the center of pivotal movement of said internal member and the center of said ball and socket remains fixed throughout the pivoting movement of said external and internal members with respect to each other.

References Cited

UNITED STATES PATENTS

| | | | |
|---|---|---|---|
| 1,868,540 | 7/1932 | Myers | 64—21 X |
| 2,352,776 | 7/1944 | Dodge | 64—21 |
| 2,427,237 | 9/1947 | Suczek | 64—21 |
| 2,862,373 | 12/1958 | Gibson | 64—21 X |
| 3,162,026 | 12/1964 | Ritsema | 64—21 |

FRED C. MATTERN, Jr., *Primary Examiner.*

HALL C. COE, *Examiner.*